United States Patent [19]

Stoffel

[11] 4,194,221
[45] Mar. 18, 1980

[54] AUTOMATIC MULTIMODE CONTINUOUS HALFTONE LINE COPY REPRODUCTION

[75] Inventor: James C. Stoffel, Rochester, N.Y.

[73] Assignee: Xerox Corporation, Stamford, Conn.

[21] Appl. No.: 973,821

[22] Filed: Dec. 26, 1978

[51] Int. Cl.² ............................................. H04N 1/40
[52] U.S. Cl. ................................... 358/283; 358/257; 358/280; 364/515
[58] Field of Search ............... 358/280, 283, 298, 257; 364/515

[56] References Cited

U.S. PATENT DOCUMENTS

| | | | |
|---|---|---|---|
| 3,819,854 | 6/1974 | Kolb | 358/283 |
| 3,965,289 | 6/1976 | Pugsley | 358/280 |
| 4,004,079 | 1/1977 | Boston | 358/283 |
| 4,032,977 | 6/1977 | Liao | 358/280 |

Primary Examiner—Howard W. Britton

[57] ABSTRACT

An image data handling system to automatically detect and segregate from a stream of image pixels high frequency half-tone image input, continuous tone image input, low frequency half-tone image input, and line image input which may be present in the pixel stream. The image pixels are first autocorrelated in accordance with a predetermined algorithm to detect if high frequency half-tone image data is present. Data of this type found is processed by first descreening and then rescreening at a lower frequency to provide binary level pixels. The pixel stream is analyzed for the presence of continuous tone image data. Where found, such data is processed by a template screening process to provide binary level pixels. Remaining pixels comprising low frequency half-tone and line copy image data are thresholded to provide binary level pixels.

18 Claims, 12 Drawing Figures

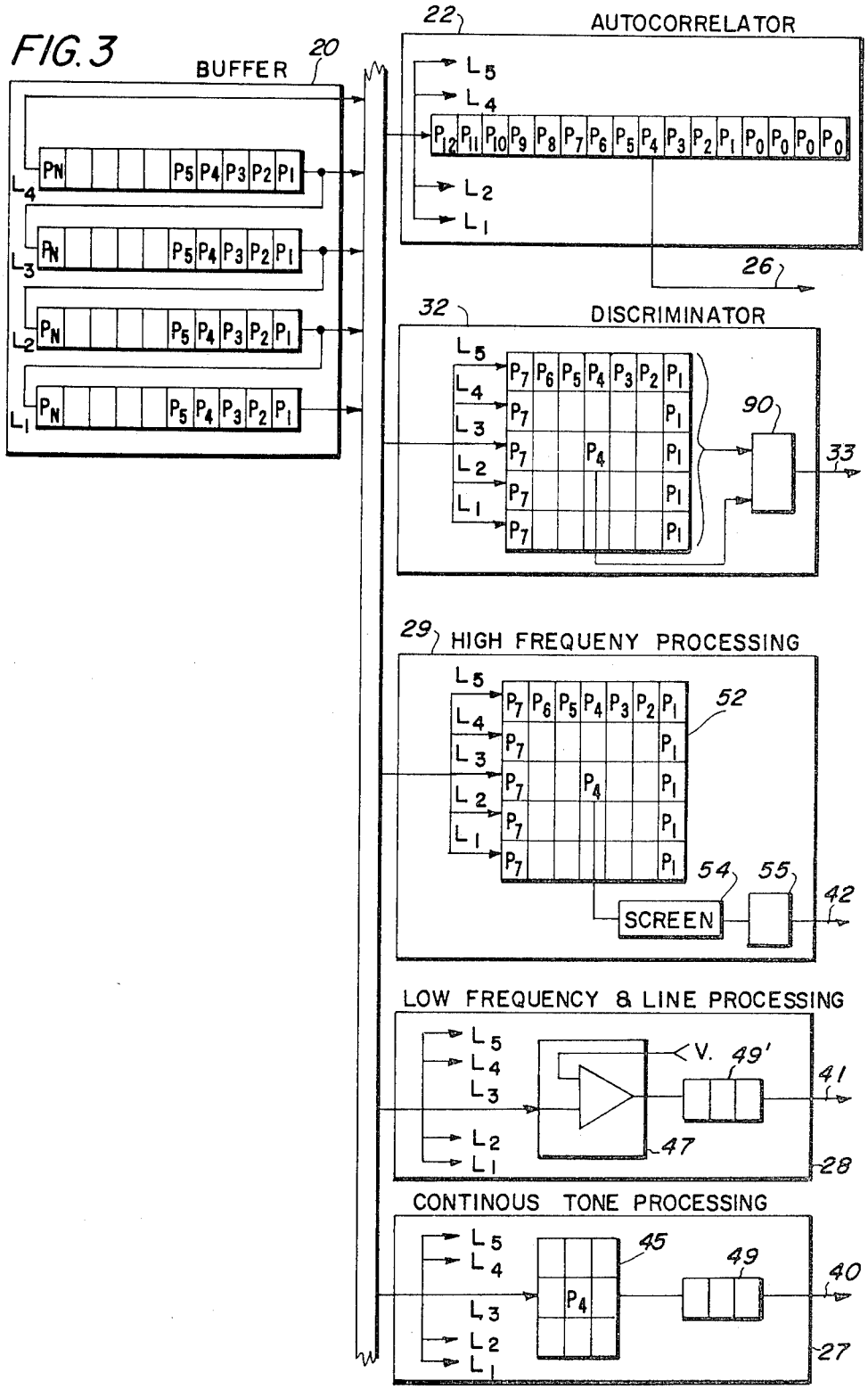

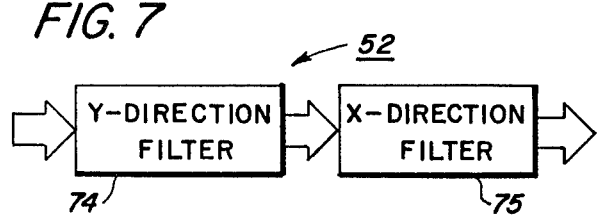
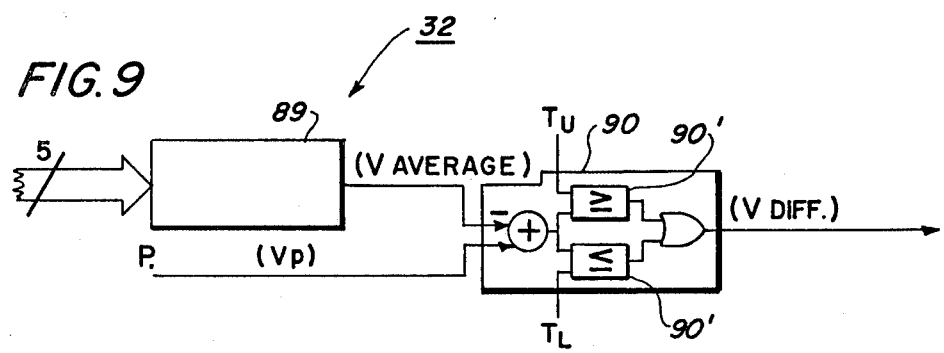
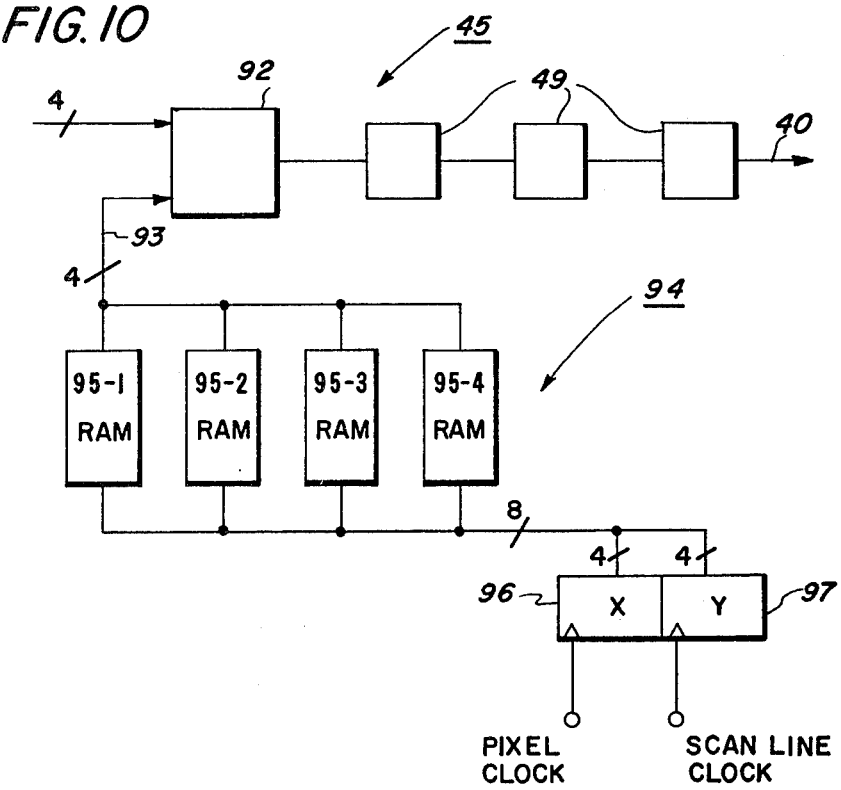

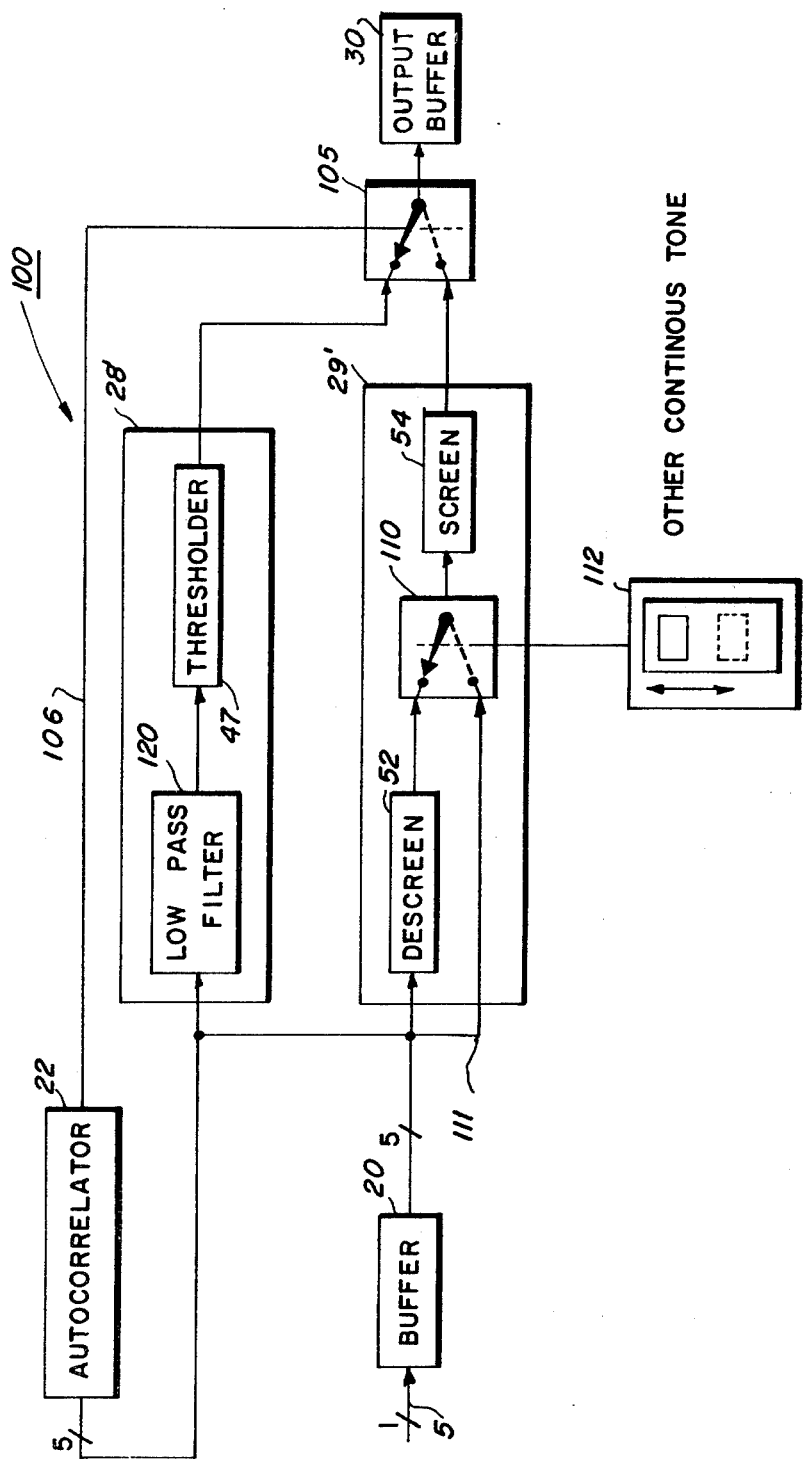

ial from video image data created, for example, by reflective scanning of an original document, one is faced with the limited resolution capabilities of typical reproducing systems, as for example, a xerographic type copier. This is particularly evident where one attempts to reproduce half-tones, particularly high frequency half-tones, and continuous tone images. Of course, the image data processing system may be tailored so as to offset the limited resolution capabilities of the reproducing apparatus used, but this is difficult due to the divergent processing needs required by the different types of image which may be encountered. In this respect, it should be understood that the image content of the original document may consist entirely of high frequency half-tones, or low frequency half-tones, or continuous tones, or line copy, or a combination, in some unknown degree, of some or all of the above. In the face of these possibilities, optimizing the image processing system for one image type in an effort to offset the limitations in the resolution capability of the reproducing apparatus used may not, unless only original documents limited to one image type are processed, be possible, and may even make matters worse. Thus, for example, where one optimizes the system for low frequency half-tones, it is often at the expense of markedly degraded reproduction of high frequency half-tones, or of line copy, and vice versa.
AUTOMATIC MULTIMODE CONTINUOUS HALFTONE LINE COPY REPRODUCTION This invention relates to a system for processing image pixels, and more particularly, to a system for automatically processing an image pixel stream having unknown percentages of high frequency half-tone, low frequency half-tone, continuous tone, and/or line image data.

Where one attempts to reproduce copies of an original from video image data created, for example, by reflective scanning of an original document, one is faced with the limited resolution capabilities of typical reproducing systems, as for example, a xerographic type copier. This is particularly evident where one attempts to reproduce half-tones, particularly high frequency half-tones, and continuous tone images. Of course, the image data processing system may be tailored so as to offset the limited resolution capabilities of the reproducing apparatus used, but this is difficult due to the divergent processing needs required by the different types of image which may be encountered. In this respect, it should be understood that the image content of the original document may consist entirely of high frequency half-tones, or low frequency half-tones, or continuous tones, or line copy, or a combination, in some unknown degree, of some or all of the above. In the face of these possibilities, optimizing the image processing system for one image type in an effort to offset the limitations in the resolution capability of the reproducing apparatus used may not, unless only original documents limited to one image type are processed, be possible, and may even make matters worse. Thus, for example, where one optimizes the system for low frequency half-tones, it is often at the expense of markedly degraded reproduction of high frequency half-tones, or of line copy, and vice versa.

This invention pertains to the method of processing automatically a stream of image pixels representing unknown combinations of high and low frequency half-tones, continuous tones, and/or lines to provide binary level output pixels representative of the image, the steps consisting of, separating high frequency half-tone image pixels in the pixel stream, descreening any high frequency half-tone image pixels found to permit rescreening at a lower frequency, separating continuous tone image signals in the pixel stream, screening any high frequency half-tone image pixels and any continuous tone image pixels found to provide binary level output pixels thereof, and thresholding the remaining low frequency half-tone and line image pixels to produce binary level output pixels.

Other objects and advantages of the present invention will be apparent from the ensuing description and drawings in which:

FIG. 3 is a schematic view of the image data processing apparatus of the present invention;

FIG. 7 is a block diagram of the descreening filter employed in high frequency pixel image processing section;

FIG. 9 is a block diagram of the pixel image discriminator filter;

FIG. 10 is a schematic view showing details of the continuous tone processing screen;

FIG. 11 is a schematic view of an alternate embodiment of the image data processing system of the present invention.

Image data in the form of video image data picture elements, (termed pixels), which may be either analog or digital voltage representations of the image, are provided from a suitable source. For example, the image data pixels may be obtained through line by line scanning of an image bearing original by one or more reflective scanners, such as a multiple element array of charge coupled devices, commonly referred to as CCDs.

Figure 1:
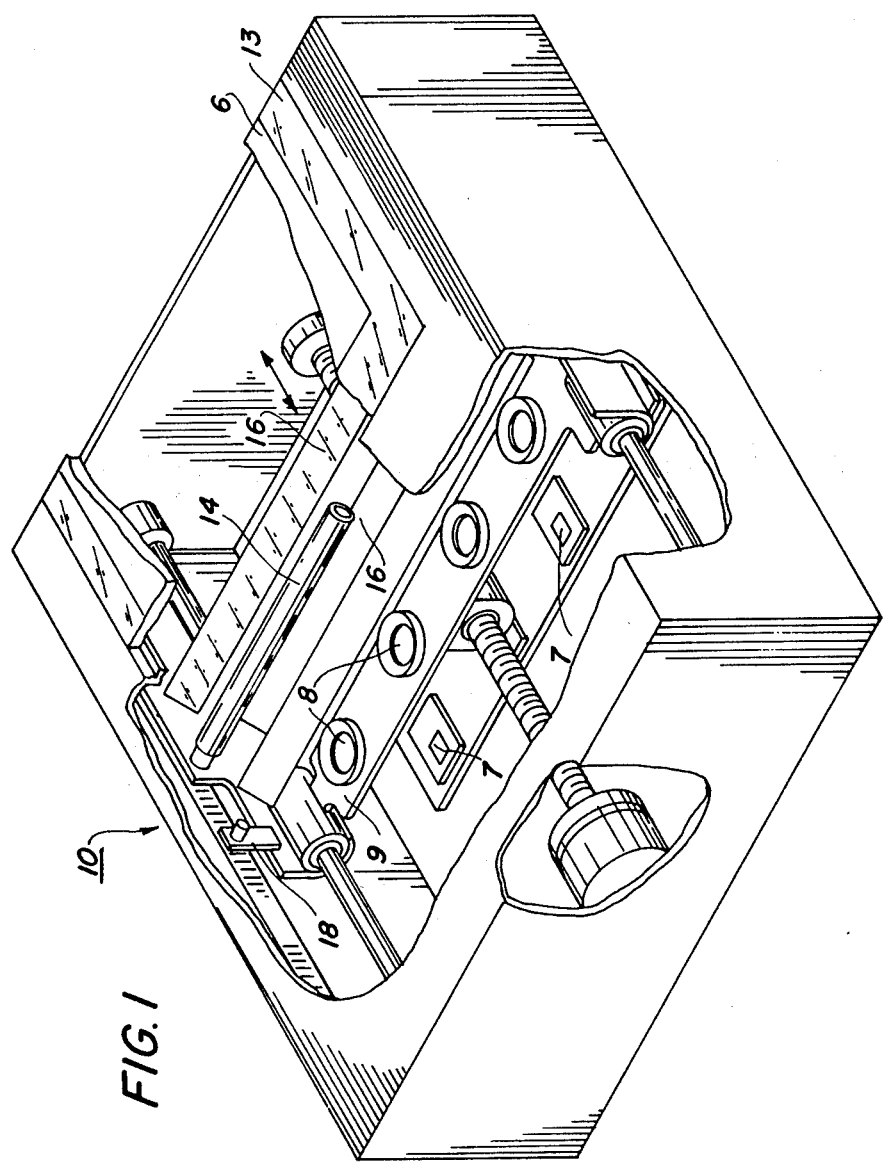
FIG. 1 is a schematic view illustrating an exemplary raster input scanner for producing image data in analog bit form of the type processed by the present invention.

Referring to FIG. 1, one such scanning apparatus 10 is thereshown. There, plural arrays 7, which are focused to form overlapping fields of view by lenses 8, are supported upon a movable carriage 9 spacedly disposed below a transparent platen glass 13 upon which an original 6 to be scanned is placed. A lamp 14 mounted on the carriage 9 provides illumination while a suitable mirror combination 16 guides the light rays reflected from the original document to the lenses 8 and the arrays 7. Timing control 18 synchronizes operation of arrays 7 with movement of carriage 9 so that as the carriage moves under platen 13 and any document 6 thereon, successive line scans are made across the width of the document. The individual viewing elements that comprise each array 7 are sampled successively as each line is scanned to produce a stream of pixels for each line scanned. The individual pixels produced each comprise a discrete voltage representation of the image area of document 6 viewed by the individual elements comprising arrays 7. The various voltage levels form a relative measure of the image area gray scale.

One commercially available scanning array is a Fairchild 121-1728 pixel 2 phase linear array manufactured by Fairchild Manufacturing Company. Further details of the aforesaid scanning apparatus may be found in U.S. Pat. No. 4,149,091, incorporated by reference herein. Other known methods of generating image data may be envisioned as for example a TV camera, etc.

In content, the original 6 may be composed entirely of lines, or low frequency halftone image(s), or high frequency halftone image(s), or continuous tone image(s), or combinations thereof. Where the original 6 consists of lines as for example a typed page, the image pixels may be converted to either one of two voltage levels, one representing non-image or background areas; the other image areas.

A continuous tone image comprises an unscreened image, typically a photograph. When scanned, the voltage values of the pixels produced are representative of the gray levels making up the picture.

A halftone image, typically a picture or scene, is one which has been reproduced through a screening process. One example is a newspaper picture. The screen used may be either a high or low frequency screen. A high frequency screen is arbitrarily defined herein as one having a frequency of 100 cells per inch or more while a low frequency screen is defined as one having a frequency less than 100 cells per inch. Halftone images, therefore, comprise a pattern of discrete dots, the dot size and frequency of which depends upon the screening frequency used. When viewed by the human eye, the dot pattern conveys a likeness of the original picture or scene. The quality of the reproduction depends upon screening frequency used, with higher screen frequencies normally providing higher quality reproductions.

Figure 2:
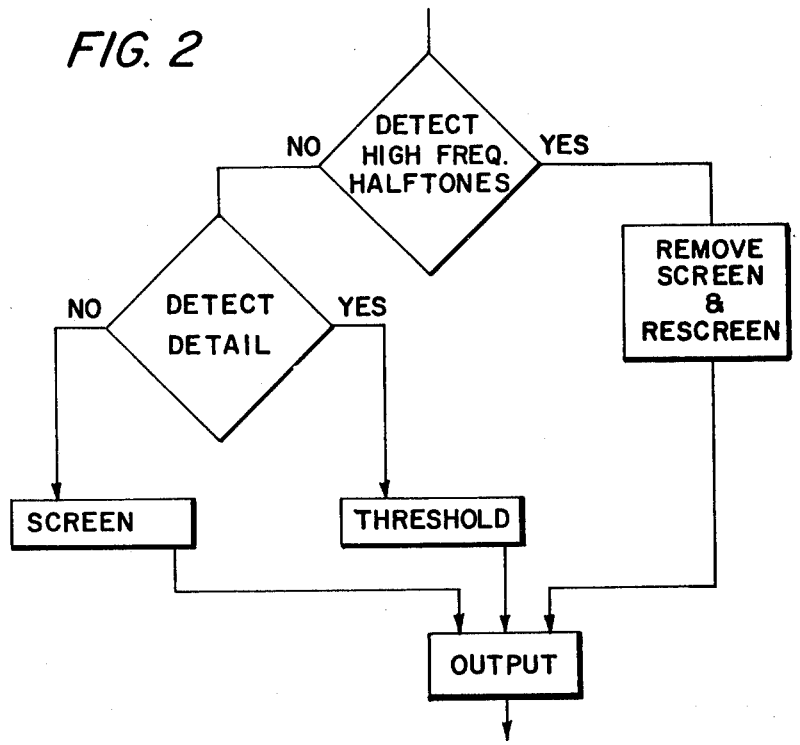
FIG. 2 is a flow chart illustrating the decision making process followed by the present invention.

Referring to the flow chart of FIG. 2, in the present invention, the incoming stream of image pixels as for example generated by scanning apparatus 10 are first examined to determine if high frequency halftone image data is present (DETECT HIGH FREQ. HALFTONES). The stream of image pixels is looked at on a block by block basis, each block comprising one or more pixels. Where high frequency halftone image data is detected, the data is descreened (REMOVE SCREEN) and then rescreened (RESCREEN) at a lower frequency to provide image pixels at the output (OUTPUT) in binary form.

The stream of image pixels may also include low frequency halftone image data, continuous tone image data, and/or line image data. The pixel stream is examined to differentiate any low frequency halftone and line image data (referred to collectively herein as DETAIL) from continuous tone image data (DETECT DETAIL). Any low frequency halftone and line image data detected is thresholded (THRESHOLD) to provide binary level pixels at the output (OUTPUT). Any continuous tone image data is screened (SCREENED) to provide binary level pixels at the output (OUTPUT).

Figure 4:
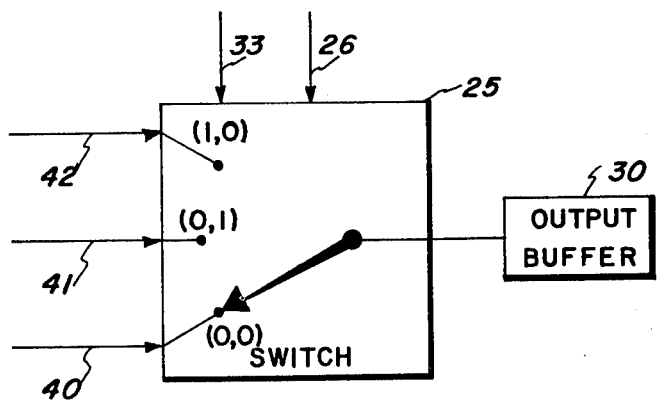
FIG. 4 is a schematic view of the pixel image data output selector.
Figure 5:
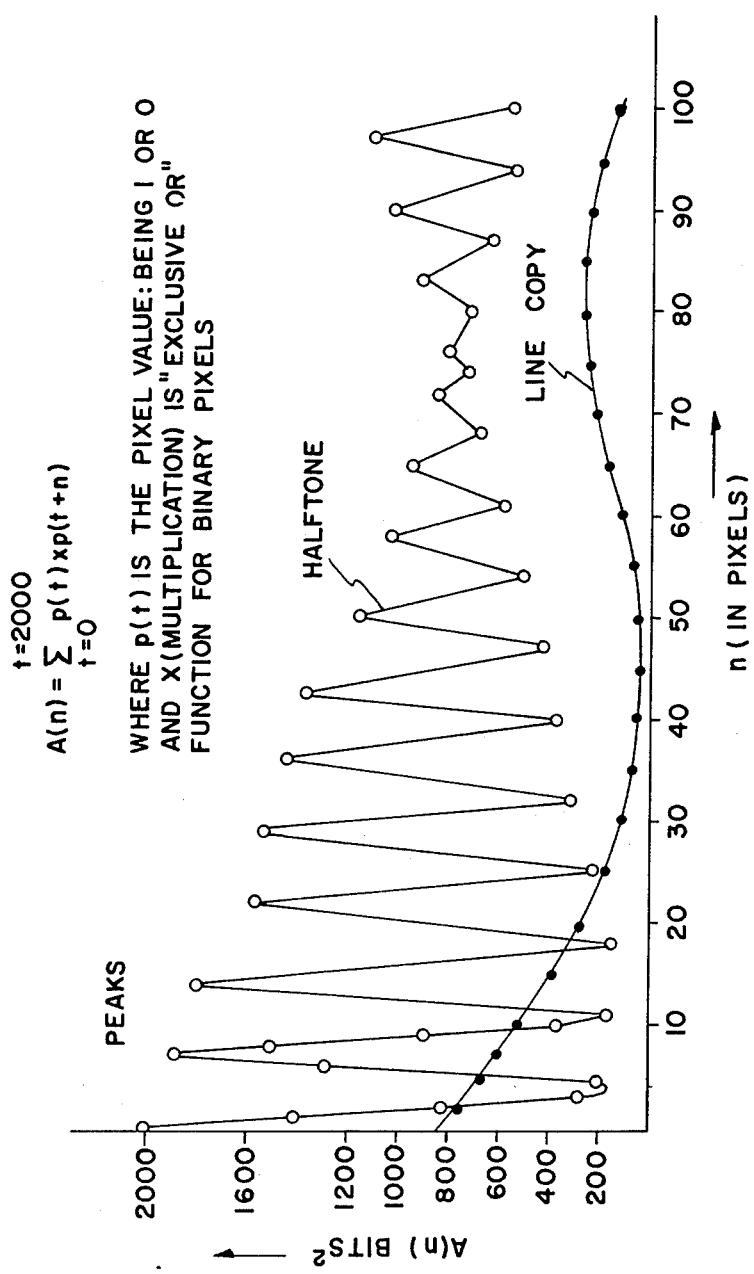
FIG. 5 is a plot of an exemplary half-tone/line autocorrelation.

Referring now to FIGS. 3 through 5, the stream of image pixels from the image data source, for example, scanning apparatus 10, is fed to a four line scrolling buffer 20. Buffer 20, which comprises any suitable commercially available serial in/serial out multirow buffer having a bit storage capacity sufficient to temporarily store four lines of image pixels, permits in the example illustrated, processing of image data in blocks of five lines. For convenience of explanation, the data lines being processed in the example are designated as lines $L_1$, $L_2$, $L_3$, $L_4$, $L_5$ with line $L_1$ representing the first scanned line of an original 6, line $L_2$ the second scanned line, etc.

In certain cases, as for example, where original 6 comprises a typed letter, it may be understood that the first few scanned lines may be all white, as representative of the top margin. Similarly, the last few scan lines, representing the bottom margin, and the areas on each side of the body of the letter, representing the side margins, may be all white. Individual pixel positions in each line are designated herein as pixels $P_1$, $P_2$, $P_3$, $P_4 \ldots P_n$, except in the case of margin areas and areas outside the document edges which are designated $P_0$. It will be understood that the number of image lines L and/or the number of pixels P processed may vary from a minimum of one to any convenient number.

To detect the presence of high frequency halftone image data, a one dimensional block of image pixels is unloaded from buffer 20 on a block by block basis into autocorrelator 22 which, as will appear, autocorrelates each pixel block in accordance with a predetermined algorithm to determine if the image data is high frequency halftone or not (DETECT HIGH FREQUENCY HALFTONES). In order to enhance that decision, additional pixels on both sides of the block of pixels being investigated are used. In the exemplary arrangement shown, image data is processed on a pixel by pixel basis with pixel $P_4$ of line $L_3$ being the particular pixel in process at the instant shown in FIGS. 3 and 4.

Autocorrelation is carried out in accordance with the following function:

$$A(n) = \sum_{t=o}^{t=\text{last}} p(t) \times p(t + n)$$

where
n = the bit or pixel number;
p = the pixel voltage value; and
t = the pixel position in the data stream.

The size of the image data blocks examined may comprise one or more pixels, with a total block size including the block of image pixels being examined preferably being of from 16 to 64 pixels in length. In the exemplary arrangement shown, image pixels comprising image line $L_3$ are examined in blocks of one pixel each over a total pixel length of 16 pixels. In this example, the 7 pixels ($P_3$, $P_2$, $P_1$, $P_0$, $P_0$, $P_0$, $P_0$) preceding the pixel in question (pixel $P_4$) and the 8 succeeding pixels ($P_5$, $P_6$, $P_7$, $P_8$, $P_9$, $P_{10}$, $P_{11}$, $P_{12}$) are used in the autocorrelation process. Where the block of pixels being examined includes margin or areas outside the document edges, represented by pixel $P_0$, a pixel value of "0" is arbitrarily used to represent the image value thereof.

The resulting data is scanned for positive peaks by a peak detector. Peaks above a certain threshold level are detected and where the distance (i.e. PERIOD) between the voltage peaks in the signal is less than a preset number, a decision is made to treat the pixel block being examined as high frequency halftone image data. In that circumstance, a preset control signal, i.e. a binary "1,0" is output to selector 25 via line 26. Where the PERIOD is greater than the preset number, a decision is made to treat the pixel block as detail (DETAIL) image data and a second preset signal, i.e. a binary "0,0" is output to selector 25.

As will appear, selector 25 selects from the outputs of continuous tone processing section 27, low frequency and line copy processing section 28, and high frequency processing section 29 in response to the control signals inputted thereto.

The presence of line copy and/or low frequency image data is determined by discriminator 32 (DETECT DETAIL). For this purpose, pixels comprising line $L_3$ are examined on a pixel by pixel basis to determine the average gray value of a multipixel region which includes the pixel being examined. In the exemplary arrangement shown, the region examined comprises a 5×7 pixel matrix with pixel $P_4$ at the center.

Discriminator 32 comprises an electronic filter in a 5×7 matrix format for analyzing image data in blocks five scan lines wide (i.e. lines $L_1$, $L_2$, $L_3$, $L_4$, $L_5$) by seven pixel positions wide (i.e. pixels $P_1$, $P_2$, $P_3$, $P_4$, $P_5$, $P_6$, $P_7$). During processing, the value of the pixels in the filter matrix are multiplied by a predetermined fractional coefficient, the value of which may be different for each pixel position in the matrix and/or which may be varied on a cyclic basis, with the resulting values summed or added to provide a gray level average value (V average) for the neighborhood or image area around the pixel being examined, i.e. pixel P4.

It should be understood that where the line of image data being processed comprises one of the first few (or last) lines of the document (i.e. lines $L_1$, $L_2$), a portion of the processing matrix is comprised of one or more imaginary lines of image data, the pixels $P_0$ of which are assigned an image value of "0".

The average value (V difference) of the neighborhood of $V_P$ is determined by filter 89 as:

V difference = ($V_P$ − V average), where $V_P$ is the value of the pixel being examined (i.e. pixel P4).

Where the absolute value of V difference is above a preset threshold, line copy and low frequency half-tone image data is determined to be present and a preset control signal, i.e. a binary "0,1" is fed to selector 25 via line 33. Where the absolute value of V difference is below or equal to the threshold, continuous tone image data is determined to be present and a second preset control signal, i.e. a binary "0,0" is output to selector 25.

Referring particularly to FIG. 4, selector 25 comprises any suitable electronic switch operable in response to coded inputs to couple one of the output lines 40, 41, 42 from continuous tone processing section 27, low frequency and line processing section 28, or high frequency processing section 29 respectively to output buffer 30. For descriptive purposes, selector 25 is illustrated simply as a three position rotary switch effective on a binary "0,0" control signal from discriminator 32 to couple the output of continuous tone processing section 27 to output buffer 30, on a binary "0,1" control signal from discriminator 32 to couple the output of low frequency and line processing section 28 to output buffer 30, and on the binary "1,0" control signal from autocorrelator 22, to couple the output of high frequency processing section 29 to output buffer 30.

Referring to FIG. 3, continuous tone processing section 27 employs a suitable template screen, which may, for example, comprise a 3×3 binary pattern screen 45, to screen the image data and provide a binary level output representative of the pixel being processed (i.e. pixel P4) to output line 40. Image data processed by continuous tone processing section 27 is fed to three pixel signal storage/delay buffer 49 pending a determination on whether to use or discard the processed data. As will appear, buffer 49 functions to impose a three pixel delay on the output of processing section 27 to correlate the outputs of processing sections 27, 28 and 29 with one another.

Where the image data is determined by discriminator 32 to comprise continuous tone image data, the data from processing section 27 in buffer 49 is fed via line 40 and selector 25 to output buffer 30. In other cases, the processed data is discarded.

Low frequency halftone and line copy processing section 28 comprise any suitable thresholding circuit 47 such as a Texas Instruments 74S85 comparator, effective to threshold the pixel being examined (pixel P4) with the output of circuit 47 going to a three pixel storage/delay buffer 49'. For example, thresholding circuit 47 may provide a single level threshold against which the pixel being examined (pixel P4) is compared.

Where the image data processed by low frequency half-tone and line copy processing section 28 is determined by discriminator 32 to comprise low frequency halftone or line copy image data, the data is inputted from storage/delay buffer 49' via line 41 and selector 25 to output buffer 30. In other cases, the processed data is discarded.

Continuous tone processing section 27 and low frequency halftone and line copy processing section 28 process in real time whereas high frequency halftone processing section, as will appear, incorporates both descreening and rescreening functions, each requiring one pixel count to effect processing of the image data. As a result, the output of processing section 29 relative to sections 27, 28 is delayed by two pixels. To offset this delay in data processing and to time relate the data outputs of processing sections 27, 28, 29 with one another, the aforedescribed signal storage/delay buffers 49, 49' are provided.

High frequency halftone processing section 29 employs a descreening filter 52. For example, where the scanning frequency is 500 scan lines/inch, filter 52 may comprise a simple low pass 5×7 matrix linear filter preferably tailored to provide some enhancement for sharpening edges at the points where signal levels change, to smooth out the high frequency image signals from lines $L_1$, $L_2$, $L_3$, $L_4$, $L_5$. Following descreening, the image signal is fed to a relatively low frequency electronic screen 54 of the type preferably employing cyclic changes in threshold values whereat the image is rescreened at a lower frequency. Where, as above, the original sampling frequency is 500 scan lines/inch, one suitable screen comprises a 70 cells/inch 45° screen with conventional S-shaped Tone Reproduction Control (TRC). The output of screen 54 is fed to one pixel storage buffer 55 pending determination by autocorrelator 22 of whether the image data is high frequency halftone or not.

Preferably, as will be understood by those skilled in the art, the size of the filter chosen scales with the sampling frequency.

Where the image data is determined by autocorrelator 22 to be high frequency halftone data, the data in buffer 55 of processing section 29 is fed via line 42 and selector 25 to output buffer 30. In other cases, the data is discarded.

Figure 6:
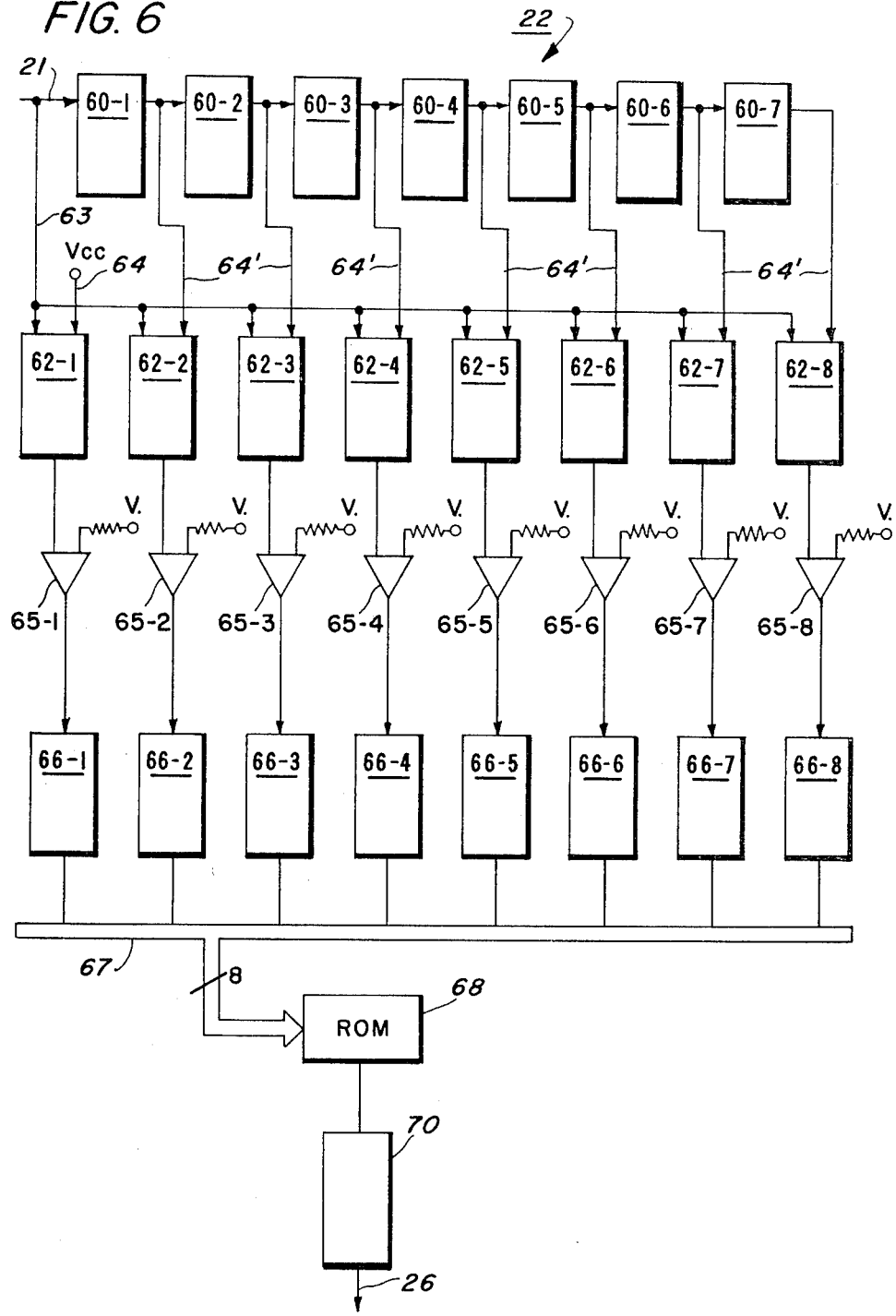
FIG. 6 is a schematic view showing details of the pixel image data autocorrelator.

Referring to FIG. 6, autocorrelator 22 includes a succession of flip flops 60-1 through 60-7 through which the input pixel stream in line 21 from buffer 20 are shifted, one pixel at a time. Correlators 62-1 through 62-8, which may comprise TRW 64 bit digital correlators (Model TDC 1004J), have one input coupled to pixel input line 21 through distributor lead 63. Line 64 couples a second input of correlator 62-1 to a suitable voltage source Vcc while lines 64' couple a second input of the remaining correlators 62-2 through 62-8 to the outputs of flip flops 60-1 through 60-7 respectively. A typical output of correlators 62-1 through 62-8 for both line and half-tone image examples, is shown in FIG. 5.

The signal output of correlators 62-1 through 62-8 is fed to one input of comparators 65-1 through 65-8 respectively. Comparators 65-1 through 65-8 may for example, comprise Signetics Model 521 comparators. A threshold voltage V, derived from a suitable voltage source (not shown), is placed on the other input of comparators 65-1 through 65-8. The outputs of comparators 65-1 through 65-8 are coupled to flip flops 66-1 through 66-8 respectively. The outputs of flip flops 66-1 through 66-8, which together combine to provide an address signal to Read Only Memory (ROM) 68, are coupled to address bus 67.

ROM 68 provides a predetermined control signal output in response to each address provided by flip flops 66-1 through 66-8. The output of ROM 68 is coupled to control flip flop 70 which provides the control signal input to line 26 controlling selector 25.

Figure 12:
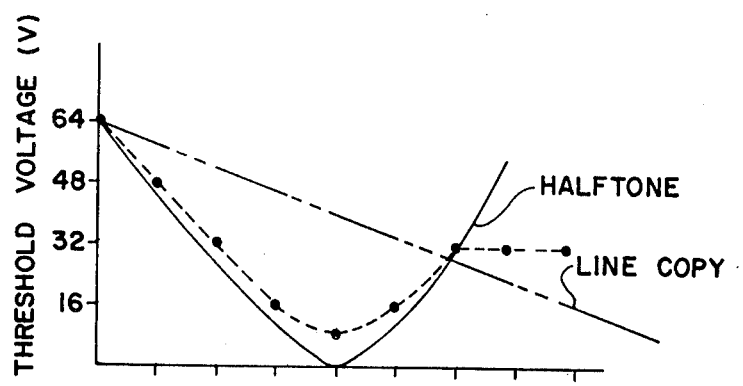
FIG. 12 is a graphical representation of typical halftone and line image addresses generated by the autocorrelator of FIG. 6.

An example of the function and operation of comparators 65-1 through 65-8 together with flip flops 66-1 through 66-8 in forming an address to ROM 68 in bus 67 is shown in FIG. 12.

Flip flops 60-1 through 60-7, 66-1 through 66-8, and 70 may comprise Texas Instruments Model SN74174 chips.

In operation, input pixels are progressively shifted through input flip flops 60-1 through 60-7 of autocorrelator 22. As the pixels shift through flip flops 60-1 through 60-7, autocorrelation of the pixel in line 21 with reference voltage Vcc and with preceding pixels is carried out by correlators 62-1 through 62-8. The output of each correlator is compared to a threshold voltage V by comparators 65-1 through 65-8. The resulting combined signal output of comparators 65-1 through 65-8 to output flip flops 66-1 through 66-8 provides an address for ROM 68. The addressed signal output of ROM 68 sets flip flop 70 providing a control signal in line 26 to selector 25.

It will be understood that different threshold voltages V may be applied to each correlator 65-1 through 65-8. Further, that number of pixels autocorrelated at one time may be enlarged or decreased by adding to or subtracting from the component parts of autocorrelator 22.

Figure 8:
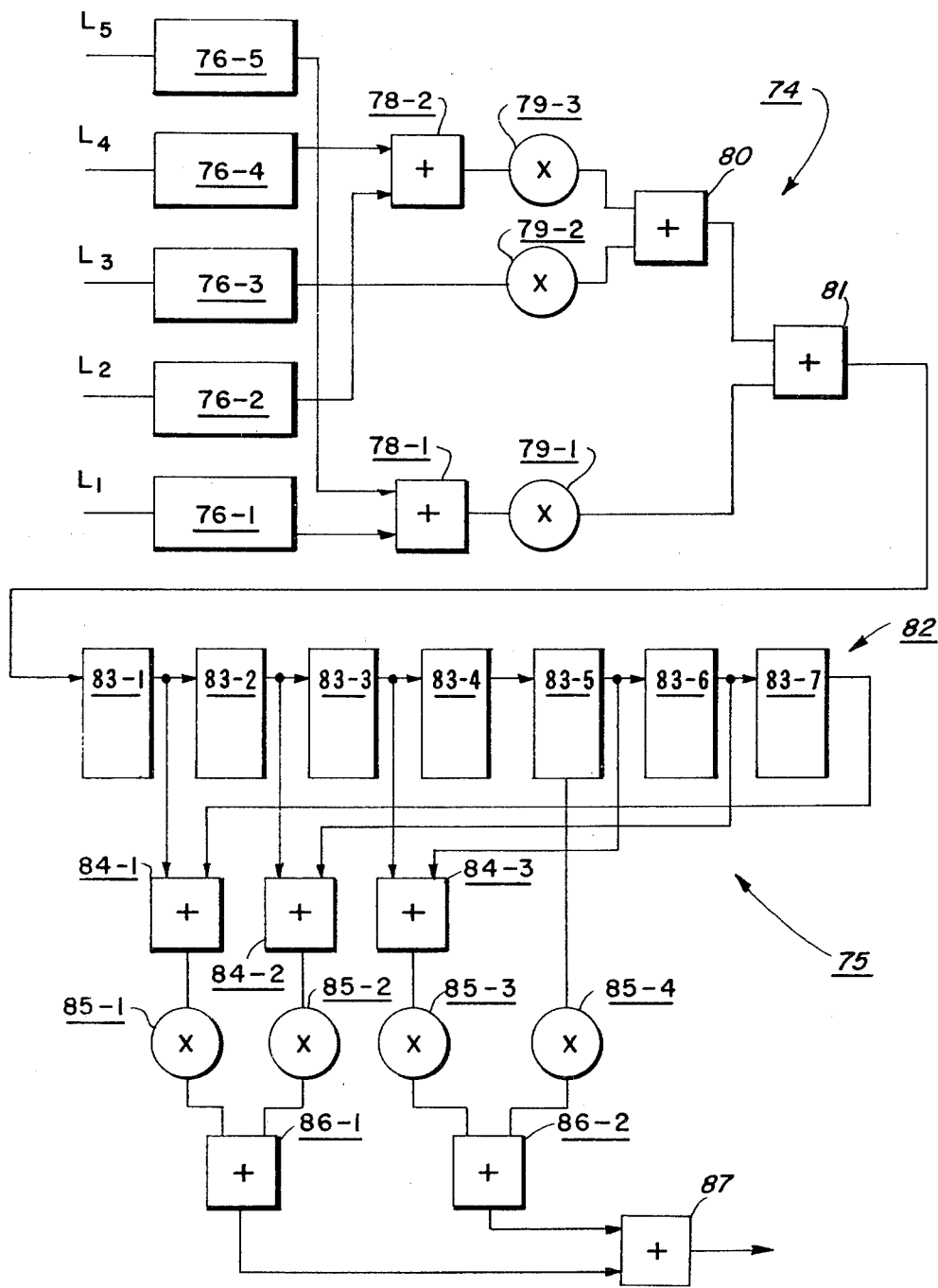
FIG. 8 is a schematic view showing details of the descreening filter shown in FIG. 7.

Referring to FIGS. 7 and 8, details of descreening filter 52 of high frequency processing section 29 are thereshown. Filter 52 may be conveniently subdivided into a Y direction filter section 74 and an X direction filter section 75. Pixel image data (in lines $L_1$–$L_5$ for example) is input to line flip flops 76-1 through 76-5 of Y direction filter section 74. Flip flops 76-1 and 76-5 are coupled to digital adder 78-1 while flip flops 76-2 and 76-4 are coupled to digital adder 78-2. Adders 78-1 and 78-2 sum the inputs thereto.

Adders 78-1 and 78-2, and flip flop 76-3 are coupled to digital multipliers 79-1, 79-3 and 79-2 respectively. In this example, multipliers 79-1, 79-2, and 79-3 multiply the pixel value input thereto by a fractional amount related to the number of pixel elements that comprise the matrix. In the example shown, filter 52 has a 5×7 matrix for a total area of 35 pixels. As a result, multiplier 79-2 is programmed to multiply the pixel input from flip flop 76-3 by ½ while multipliers 79-1 and 79-3 are programmed to multiply the pixel inputs thereto, which are the sum of two pixels, by ¼.

Multipliers 79-1 and 79-2 are coupled to adder 80. Adder 80 and multiplier 79-3 are coupled to adder 81.

X direction filter section 75 includes an input shift register 82 composed of successive flip flops 83-1 through 83-7. Adder 81 of Y direction filter 74 is coupled to flip flop 83-1 of register 82. The pixel input to register 82 is shifted sequentially through flip flops 83-1 through 83-7 that comprise shift register 82.

Flip flops 83-1 and 83-7 have outputs coupled to adder 84-1, flip flops 83-2 and 83-6 to adder 84-2, and flip flops 83-3 and 83-5 to adder 84-3. Adders 84-1, 84-2 and 84-3, together with flip flop 83-4 are coupled to multipliers 85-1 through 85-4 which as explained heretofore multiply the pixel input thereto by the matrix fractional multiplier. Multipliers 85-1 and 85-2, and 85-3 and 85-4 are coupled to adders 86-1 and 86-2 which sum the inputs thereto. Adders 86-1 and 86-2 are coupled to adder 87 which sums the inputs thereto to provide the output from filter 52.

It will be understood by those skilled in the art that a digital transversal filter transfer function can be optimized to perform various weighted averages of the two dimensional context.

In the foregoing circuit, the flip flops used therein may comprise Texas Instruments Model 745174 chips, the adders Texas Instruments Model 74S183 binary adders and the multipliers TRW Model MPY8A binary multipliers.

In operation, filter 52 effectively sums the pixel image values of each 5×7 pixel matrix including the pixel (i.e. pixel $P_4$) being processed, and divides (through fractional multiplication) the total by the number of pixels that comprise the screen matrix, in this instance, 35. The result is the weighted average pixel value of the neighborhood of the pixel being examined (i.e. pixel $P_4$) which represents the descreened value thereof.

Referring to FIG. 9, discriminator 32 includes a 5×7 matrix filter 89 which provides the average gray value of the pixel being examined (i.e. pixel $P_4$) as one input to circuit 90. To this end, filter 89 may comprise the same structure as that of filter 52 described heretofore. The image value of the pixel being examined (i.e. pixel $P_4$) forms a second input to circuit 90.

Circuit 90 functions to compare the output of filter 89 (V average) with the pixel image value ($V_p$). The output of circuit 90 comprises the absolute pixel image value (V difference) of the difference between the pixel ($V_p$) and the average values as discussed earlier herein.

Circuit 90 includes in addition to an Adder, a pair of Texas Instruments Model 74585 4 bit digital comparators 90'.

Referring to FIG. 10, screen 45 of continuous tone processing section 27 comprises an input comparator 92 for comparing pixel image values with predetermined screen thresholds provided in line 93 by memory unit 94. Memory unit 94 has plural RAM storage memories 95-1 through 95-4 which may, for example comprise Fairchild Corp. Model 93425 RAMs, for storing the predetermined screen threshold values. RAMs 95-1 through 95-4 are addressed through X and Y address counters 95, 97, X address counter 96 being driven by clock pulses from the pixel clock (not shown) and Y address counter 97 being driven or indexed by pulses from a scan line clock (not shown) on each line change.

Comparator 92 may comprise Texas Instruments Model 74585 4 bit comparator while counters 96, 97 may comprise Texas Instruments #74163 binary counters.

Referring now to the embodiment of FIG. 11, there is shown a semi-automatic image data processing system 100. In system 100, the determination of the existance of continuous tone image data is made by the operator or user rather than automatically as in the case of the embodiment discussed heretofor. As described heretofore, a continuous tone original may be thought of as a photograph which normally is readily recognizable by the user when handling originals to be processed.

In data processing system 100, wherein like numerals refer to like parts, the stream of image pixels 5 are inputted to autocorrelator 22, which serves to detect the presence of high frequency half tone image data in the pixel stream as described heretofore. At the same time, the image data is inputted to scrolling buffer 20.

Where high frequency halftone image data is detected by autocorrelator 22, a preset control signal i.e. a binary "0,1" is output to two-way selector 105 via line 106. Selector 105 couples the output of high frequency halftone processing section 29' to output buffer 30. In other cases, i.e. where the control signal from autocorrelator 22 comprises a binary "0,0", selector 105 couples low frequency halftone and line copy processing section 28' to output buffer 30.

As described earlier, scrolling buffer 20 serves to temporarily store a block of image data for processing purposes. In the example shown, buffer 20 holds a block of four scan lines (i.e. lines $L_1$, $L_2$, $L_3$, $L_4$), it being understood that the remaining scan line (i.e. line $L_5$) is processed in real time. As a result, each scan line is processed in blocks of five scan lines (i.e. lines $L_1$, $L_2$, $L_3$, $L_4$, $L_5$) at a time.

High frequency halftone image processing section 29' is similar to processing section 29 discussed earlier in the inclusion of a descreening filter 52 for descreening the high frequency halftone image data, and a screen 54 for rescreening the now descreened image data from filter 52. Processing section 29' is modified by the addition of a suitable two-way selector 110 between descreening filter 52 and screen 54, selector 110 permitting either descreened high frequency halftone image data from filter 52 or continuous tone image data in line 111 to be inputted directly from buffer 20 to screen 54 for screening. Selector 110 is controlled by a manual two-position controller 112. Controller 112 is placed at some point conveniently accessable to the user, preferably near the area where originals 6 are processed. In the exemplary scanning apparatus 10 shown in FIG. 1, controller 112 may be placed adjacent platen 6, for example to permit the user to readily access controller 112 when inputting originals to scanning apparatus 10.

When a continuous tone original 6 is detected, the user manually sets controller 112 to the continuous tone position (the dotted line position shown in FIG. 11). This disposition of controller 112 places selector 110 in the dotted line position shown in FIG. 11 to route continuous tone image data directly to screen 54 for screening. Where the original to be processed is not continuous tone, controller 112 is set in the solid line position. This places selector 110 in the solid line position to route descreened high frequency halftone image data from descreening filter 52 to screen 54 for rescreening thereof.

Low frequency halftone and line copy processing section 28' is similar to processing section 28 discussed earlier in the inclusion of a thresholding circuit for thresholding the image pixels against a fixed or cyclically varied threshold level. Additionally, there is provided, upstream of thresholding circuit 47, a suitable high frequency enhancement filter 120 selected to provide detail enhancement of the low frequency halftone image or line copy image data in a manner understood by those skilled in the art. One implementation consists of a transversal filter similar in implementation to that of descreening filter 52 with a different weighting function.

The image data from either low frequency halftone and line copy section 28' or from screen 54 of high frequency halftone processing section 29' is routed to output buffer 30, where it may be held on either a temporary or permanent basis, by selector 105. Unused image data is discarded.

It is understood that the determination of the presence of halftone image data rather than continuous tone image data may instead be left up to the operator or user. In that circumstance, the solid line/dotted line positions of selector 110 shown in the drawing would be reversed. As a result, image data would automatically be treated and processed as continuous tone image data unless and until selector 110 was actuated by the operator to route the image data to descreening filter 52 for processing as halftone image data.

While the invention has been described with reference to the structure disclosed, it is not confined to the details set forth, but is intended to cover such modifications or changes as may come within the scope of the following claims:

What is claimed is:

1. The method of processing automatically image pixels which may comprise high or low frequency halftones, continuous tones, and/or lines to provide binary level output pixels, the steps which comprise:
   (a) separating any high frequency half-tone image pixels from said image pixels;
   (b) descreening any high frequency half-tone image pixels found to permit rescreening at a lower frequency;
   (c) separating any continuous tone image pixels from said image pixels;
   (d) screening any image pixels from steps b and c to produce binary level output pixels thereof; and
   (e) thresholding the remaining low frequency half-tone and line image pixels to produce binary level output pixels.

2. The method according to claim 1 including the step of autocorrelating a preset block of said image pixels over a predetermined range to identify said high frequency half-tone image pixels.

3. The method according to claim 1 or 2 including the step of filtering said high frequency half-tone image pixels to descreen said high frequency half-tone image pixels.

4. The method according to claim 1 including the steps of:
   (a) filtering a preset block of image pixels to determine the average gray value of said block of image pixels;
   (b) comparing the gray value from step a with a preset gray value; and
   (c) selecting a predetermined binary output signal pattern from various predetermined binary output signal patterns stored in memory in response to a first preset comparison.

5. The method according to claim 4, including the step of thresholding said preset block of image pixels to provide said binary output signals on a second preset comparison.

6. The method of automatically processing unknown image pixels, the steps comprising:
   (a) identifying high frequency half-tone image pixels in said image pixels;
   (b) identifying continuous tone image pixels in said image data;
   (c) identifying low frequency half-tone and line pixels in said image pixels;
   (d) descreening any image pixels found in step a;
   (e) screening any image pixels produced by steps b or d; and
   (f) thresholding any image pixels found in step c.

7. In the method of processing image data in the form of pixels to provide binary level output pixels, the steps which comprise:
(a) identifying continuous tone or high frequency half-tone pixels in said image data;
(b) descreening said high frequency half-tone pixels to provide descreened high frequency half-tone pixels;
(c) screening said continuous tone and said descreened high frequency half-tone pixels to provide said binary level output pixels; and
(d) thresholding the remaining pixels in said image data to convert said remaining pixels to binary level output pixels.

8. In an apparatus for processing a stream of image data, said image data being in the form of pixels whose signal levels represent the intensity of the discrete image areas represented by each pixel, the combination comprising:
(a) image data identifying means for identifying high frequency half-tone and continuous tone pixels in said stream of image data;
(b) descreen means for descreening any high frequency half-tone pixels found;
(c) screen means for screening any continuous tone and descreened high frequency half-tone pixels found; and
(d) threshold means for thresholding pixels remaining in said image data stream.

9. The apparatus according to claim 8 in which said image data identifying means includes:
(a) autocorrelator means for identifying any high frequency half-tone pixels in said stream of image data; and
(b) discriminator means for identifying any continuous tone pixels in said stream of image data.

10. The apparatus according to claim 8 in which said descreen means includes filter means for low pass filtering the signal levels of said high frequency half-tone pixels with the signal levels of a preset number of neighboring pixels to provide a descreened high frequency half-tone pixel output.

11. The apparatus according to claim 8 or 9 in which said descreen means includes filter means for averaging the signal levels of said image data pixels with the signal levels of a preset number of adjoining pixels to provide a signal reflecting continuous tone pixels.

12. The apparatus according to claim 8 in which said threshold means includes a comparator gate for comparing the signal levels of said remaining pixels with a preset reference signal level.

13. The apparatus according to claim 8 in which said screen means includes means for comparing said continuous tone and descreened high frequency halftone pixels with predetermined pixel threshold values.

14. In an apparatus for processing image data, said image data being in the form of a stream of image pixels whose signal levels represent the intensity of the discrete image areas represented by each pixel, the combination comprising:
(a) means for producing a first control signal in response to the presence of high frequency half-tone image pixels in said pixel stream, a second control signal in response to the presence of continuous tone image pixels in said pixel stream, and a third control signal in response to the presence of low frequency half-tone and line copy image pixels in said pixel stream;
(b) first image data processing means for processing high frequency half-tone image pixels;
(c) second image data processing means for processing continuous tone image pixels;
(d) third image data processing means for processing low frequency half-tone and line copy image pixels; and
(e) control means responsive to said first, second and third control signals for actuating said first, second and third image data processing means respectively whereof to process said image data regardless of the pixel content of said image data.

15. The apparatus according to claim 8 including means for selectively bypassing said descreen means.

16. The apparatus according to claim 15 including an output bus for processed data, and control means for coupling the output of one of said screen means and threshold means with said output bus, said image data identifying means including means responsive to detection of high frequency halftone or continuous tone pixels for actuating said control means to couple said screen means output with said output bus, said last mentioned means actuating said control means to couple said threshold means output with said output bus when pixels other than said high frequency halftone or continuous tone pixels are detected.

17. In an apparatus for processing image pixels which may represent continuous tone images, high frequency halftone images, low frequency halftone images, and/or line images, the combination of:
(a) descreening means for descreening high frequency halftone image pixels;
(b) screening means coupled to said descreening means output for rescreening descreened high frequency halftone image pixels output from said descreening means;
(c) thresholding means for thresholding low frequency halftone and line image pixels; and
(d) bypass means effective when actuated to bypass said descreening means to permit continuous tone image pixels to be routed directly to said screening means.

18. The apparatus according to claim 17 including:
(a) an output for said image pixels;
(b) selector means for selectively coupling one of said thresholding means and said screening means with said output; and
(c) control means for actuating said selector means to couple said thresholding means with said output when said image pixels comprise low frequency halftone image pixels or line image pixels, and to couple said screening means with said output when said image pixels comprise high frequency halftone image pixels or continuous tone image pixels.

* * * * *